Sept. 20, 1966   D. L. BIESECKER   3,273,441
NUT CONSTRUCTION
Filed Jan. 19, 1962
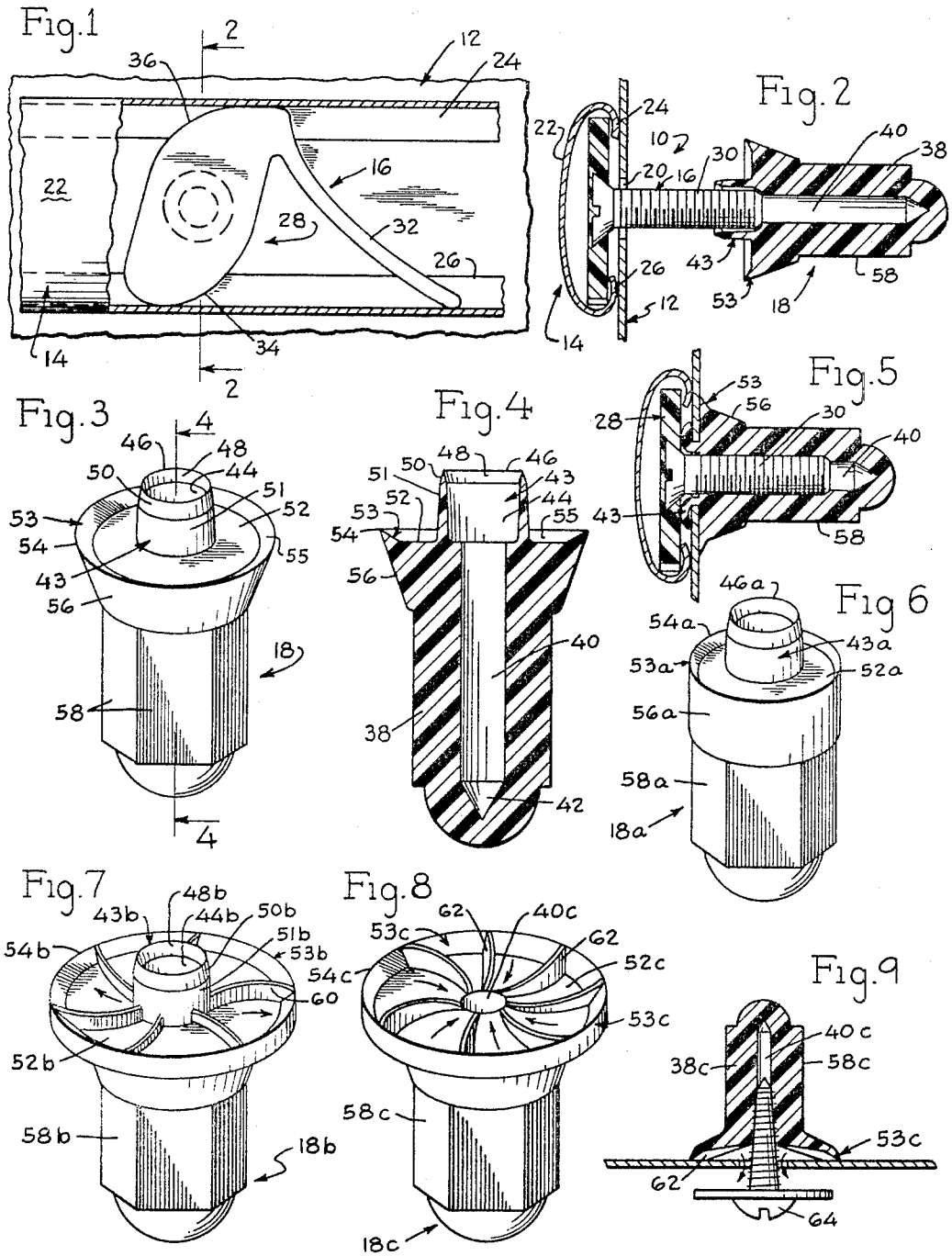
INVENTOR.
Donald L. Biesecker
BY Robert D. Silver
ATT'Y.

United States Patent Office 3,273,441
Patented Sept. 20, 1966

3,273,441
NUT CONSTRUCTION
Donald L. Biesecker, Arlington Heights, Ill., assignor to Illinois Tool Works Inc., Chicago, Ill., a corporation of Delaware
Filed Jan. 19, 1962, Ser. No. 167,348
4 Claims. (Cl. 85—35)

This invention relates in general to a fastener assembly and in addition relates to a nut construction per se.

A severe problem has heretofore existed in the fastening of trim and other components to work panels such as, for example, panels on an automobile. In fastening automobile trim to the automobile body, it is usual to punch holes in the panel and then with a suitable molding clip hold the trim in position on the body by fastening the trim through the aperture with a suitable nut on the reverse side. However, it has been found that the molding clips used in fastening the trim have been subject to severe rusting, the rusting mainly occurring at the point where the metal screw or bolt portion of the molding clip engages the margins of the hole in the work panel. Thus, it is not uncommon to see dark spots immediately below the trim on an automobile caused by the rusty fastening assembly. In addition to the unsightly appearance of the construction, the rust, of course, deteriorates the molding clip to the point where the automobile body panel as well as the molding clip per se becomes unusable. Even in situations where the threaded shank portion of the molding clip is heavily coated with rust preventive finishes and where the body panel aperture is coated with several protective finishes, these rusting spots have heretofore appeared due to the abrading action of thread crests of the fastener shank with the margins of the panel aperture, the abrading action being caused by vibration of the automobile in use.

This invention is concerned with solving the foregoing problems in an expeditious and economical manner. The general object of this invention is to provide an assembly construction which has requisite strength and durability and which will prevent rusting from occurring between a metallic threaded shank and a work pannel.

More particularly, it is an object of this invention to provide a novel construction wherein a molding clip fastener assembly is formed of two parts which when assembled together completely encase the metallic threaded portion of a shank so as to prevent rusting thereof, while protecting the threaded shank from abrading upon the margins of the aperture of the work panel to which the construction is applied.

Anothr object of this invention is to provide a mounting means for trim and the like which comprises a two part fastener, the first part having a plastic head and a metallic threaded screw shank, the second part being a plastic nut which engages the plastic head of the first part so as to prevent contact of the work panel with the metallic shank.

Still another object of this invention is to provide a novel nut construction per se wherein a plastic nut is provided having an axially extending lip portion which is deformable and which will eyelet outwardly upon engaging an abutting surface.

Still another object of this invention is to provide a nut construction as above identified wherein the nut has a closed end and an unthreaded bore, said nut also having a supplementary sealing and biasing lip which deforms and engages one side of a work panel while the first mentioned eyeletting lip engages the other side of the panel, the biasing action together with the unthreaded bore providing a locking action to a threaded shank after assembly thereto.

Still another object of this invention is to provide, in certain forms of the invention, nuts which will provide radial movement of sealing material as, for example, viscous undercoating material and other sealants, one construction providing structure for moving the sealing material radially outwardly and another construction providing structure for moving the sealing material radially inwardly as an incident to the rotation of the fastener.

The novel features that are characteristic of the invention are set forth with particularity in the appended claims. The invention itself, both as to its organization and its method of operation, together with additional objects and advantages thereof will best be understood by the following description of specific embodiments when read in connection with the accompanying drawings in which;

FIG. 1 is a top plan view, partially in section, illustrating the total assembly;

FIG. 2 is a sectional view along lines 2—2 of FIG. 1 showing the components at the start of the assembly operation;

FIG. 3 is an isometric perspective view of one component of the fastener assembly illustrated in FIG. 2;

FIG. 4 is a sectional view along lines 4—4 of FIG. 3;

FIG. 5 is a sectional view similar to FIG. 2 showing the component parts in their finally assembled relationship;

FIG. 6 is a view similar to FIG. 3 illustrating an alternate form of nut construction;

FIG. 7 is a view similar to FIGS. 3 and 6 illustrating still another form of nut construction;

FIG. 8 is a view of still another alternative embodiment of nut construction similar to those shown in FIGS. 3, 6 and 7; and FIG. 9 is a sectional view of the nut shown in FIG. 8 as it is being assembled to a work panel or the like.

While the instant invention shall be described in connection with the fastening of molding trim for an automobile and the like, it is to be expressly noted that this is to be considered illustrative rather than limiting. The assembly 10 shown in FIGS. 1 and 2 essentially comprises a work panel 12, for example, a body panel of an automobile, a molding member 14, a first fastener member 16 and a second fastener member 18. Body panels 12 for automobiles and the like are conventionally apertured as shown at 20 and formed with a plurality of coatings which prevent weathering and rusting of the panel. The molding trims such as 14, may be made of stainless steel or aluminum, or of other materials heavily coated with chrome such that they are well protected against rusting. The trim 22 is shown conventionally formed with inwardly curved edge portions 24 and 26 for fastening in a blind manner as shown in FIGS. 1 and 2.

The molding clip construction comprising the fasteners 16 and 18 is adapted to engage and hold the trim 14 to the work panel 12. The fastener 16 comprises a head portion 28 which is preferably formed of plastic such as sold under the trade names nylon or Delrin. The head 28 has a major portion of somewhat rhomboidal shape in plan view with opposed surfaces thereof tapered so as to fit a variety of sizes of trim. The major portion has an arm portion 32 integral therewith which is distorted from its molded position to bias the head portion 28 so that curved cam surfaces 34 and 36 will snugly engage the juncture between the main body portion of the trim 22 and the curved portions 24 and 26.

The method of manufacturing the fastener 16 is more particularly shown in the copending application Serial No. 190,530 filed the 27th day of April 1962, now Patent No. 3,238,287, granted March 1, 1966 and assigned to the same assignee.

The fastener 16 after attachment to the trim 14 is inserted in the aperture 20 in the body panel 12. The aperture 20 is larger than the shank portion 30 of fastener 16 and in certain instances the aperture 20 may take the form of an elongated slot. The second fastener here shown in the form of a nut 18 is then tightened onto the shank 30, the shape of the head portion of the fastener 16 preventing rotation of the fastener 16 during fastening of the second fastener 18. The fastener 18 coacts with the shank 30 and the underside of the head 28 of the first fastener means 16 in a special manner as well as coacting with the panel 12 and the aperture 20 as shall be described subsequent to the description of the fastener 18 per se.

The fastener 18 has an elongated body 38 preferably formed of molded, hard, durable, yet somewhat tough and flexible material, such as nylon, Delrin or the like. Fastener 18 is essentially a closed end nut having a central chamber or bore 40 which is closed at 42. The length of the body 38 is substantially greater than the diameter thereof. At the end opposite to the closed end is an axially extending lip portion 43, the inner diameter 44 of which is slightly larger than the bore 40. The inner diameter 44 of lip 43 in essence provides a counterbore for the bore or chamber 40 and aids in initial assembly of the shank portion 30 of the fastener 16. As perhaps best perceived in FIG. 4, the inner diameter 44 of the lip portion 43 tapers outwardly slightly from the axis of the fastener and the lip 43 is coaxial with the bore 40. The lip 43 has an axial height above the diametrical surface 52 which is substantially greater than the thickness of the work panel 12. The axially outer end 46 of the lip portion 43 is essentially a sharp edge formed by the bevelled surfaces 48 and 50. Inner bevelled surface 48 is at a sharper divergent outwardly angle than the taper of the counterbore 44 for purposes hereinafter appearing. The outer wall 51 of the lip portion 43 may be coaxial with the axis of the fastener or, as here shown, tapers inwardly slightly towards the axis, the latter configuration being preferred for providing a draft angle for molding purposes.

A second axially extending lip 53 is elevated axially outwardly from the diametrical surface 52 at the outer periphery of the surface 52. The second lip 53 also terminates in a relatively sharp edge 54 and is formed by two tapered surfaces 55 and 56. It will be noted that surface 55 is disposed at a relatively shallow angle to the diametrical plane to assure that the lip 53 will flatten radially outwardly when the fastener is drawn up tight against the work panel 12. The outer side walls of the body 38 are formed with a plurality of wrench engageable flats 58 for imparting rotation to the fastener 18. Various other configurations of exterior surfaces are available for imparting rotation to the fastener which are not shown.

As shown in FIG. 2, as the nut 18 is assembled on the shank 30, the counterbore 44, particularly at its axially outward extent, is slightly larger than the crest diameter of the shank 30 of fastener 16. The counterbore aids in initial starting of threaded engagement with a thread forming screw into the unthreaded portion of bore 40. As the fastener 18 is rotated, the lips 43 extend through the aperture 20 in the panel 12 and eyelet back upon the panel 12 on the side opposite to the side of the panel engaged by the diametrical surface 52. Due to the slight outward taper of bore 44 plus the additional taper of surface 48, the lips 43 will eyelet back onto the panel 12 even when the head of the bolt which is protruding from the plastic head 28 of the molding trim is not bevelled where it extends below the plastic head 28. In other words, the shape and configuration of the lips 43 are such that they are predisposed towards eyeletting outwardly.

The nut is preferredly tightened to a final position as shown in FIG. 5. In this position the lip 53 is flattened to provide a continual bias towards a clamping relationship of the fasteners 16 and 18 to the panel 12. The lip 53 engages the undersurface of the plastic head 28 of fastener 16 and the metallic shank 30 of fastener 16 is completely encapsulated by plastic material. Due to the construction as shown in FIG. 5, the sharp crest of the threads of shank 30 are prevented from contacting the edges of the panel aperture 20 and thus the weatherproofing or coatings on the panel 20 are not rubbed off during normal vibration encountered in normal use of the panel 20. Due to the characteristics of the plastic material, a prevailing torque lock is imposed upon the threads of the threaded shank 30, which in addition to the bias imparted by the lip 53 maintains the fasteners 16 and 18 in assembled relationship once their relationship is attained.

The form of nut 18a shown in FIG. 6 is essentially similar to that shown in FIGS. 2 through 4 and similar reference numerals for similar parts will be used together with the suffix a. The nut 18a differs from nut 18 mainly in surface 56a. Some applications require a smaller diametrical extent of the total nut and in this nut 18a, surface 56a is substantially axially aligned and surface 52a does not have as great a radial extent as shown in nut 18. The nut 18a cooperates with the panel 12 and the fastener 16 essentially similarly to fastener 18.

The nut means 18b and 18c shown in FIGS. 7 through 9 are essentially similar in concept to those shown in FIGS. 2 through 6 and similar reference numerals shall be used with similar parts with the addition of the suffixes b and c respectively. The fasteners 18b and 18c are specifically designed to accommodate the sealing "gunk" often utilized as undercoating with automobile bodies. The embodiment 18b shown in FIG. 7 is essentially similar to that shown in FIG. 4 except for the addition of a plurality of radial vanes 60 which are disposed so as to extend axially outwardly from the diametrical surface 52b. The vanes 60 are curvilinear rather than true radial lines and are so curvilinearly disposed on the surface 52b so as to move sealing "gunk" radially outwardly as an incident to rotation of the fastener. In essence, the nut fastener 18b will clean a surface of the work panel 12 so that a metal to fastener seal is possible when the fastener is torqued down into finally assembled relationship similar to that shown in FIG. 5. The vanes 60 are very thin and deform to essentially flat relationship coextensive with the diametrical surface 52b after assembly to a panel. In all other respects the fastener 18b operates essentially similar to that aforedescribed.

The fastener 18c differs from the foregoing in two major respects. This fastener has only the radially outward axially extending lip 53c and does not have the equivalent to lip 43. The diametrical surface 52c is formed with the plurality of thin vanes 62 which are curvilinear and which receed in axial height from the outer periphery to the bore 40c. The curve of the vanes 62 and their disposition on surface 52 is such as to move sealing fluids or "gunk" radially inwardly as an incident to rotation of the fastener. This is illustrated semidiagrammatically in FIG. 9. Due to the disposition of the vanes 62, the sealing material or "gunk" is forced radially inwardly so as to go through the aperture 20 in the panel 12 to cause a sealing relationship to a fastener such as 64.

Although specific embodiments of the invention have been shown and described, it is with full awareness that many modifications thereof are possible. The invention, therefore, is not to be restricted insofar as is necessitated by the prior art and by the spirit of the appended claims.

What is claimed as the invention is:

1. A molded plastic article for sealing attachment to a threaded fastener and a work panel comprising an elongated member having a closed end and a centrally located chamber of predetermined diameter opening to the opposite end, said elongated member having outer side walls formed with wrench engageable flats, said opposite end being characterized as having an axially extending lip of relatively thin deformable cross section and of a diameter greater than said predetermined diameter, said opposite end further having a diametrical surface with a plurality of curvilinear axially extending vanes of relatively thin deformable cross section extending in the diametrical plane from the vicinity of said recess to the vicinity of the periphery of said diametrical surface, said vanes upon rotation of article about its axis being of a curvature adapted to move fluid material in a generally radial direction.

2. A molded plastic article for sealing attachment to a threaded fastener and a work panel comprising an elongated member having a closed end and a centrally located chamber of predetermined diameter opening to the opposite end, said elongated member having outer side walls formed with wrench engagable flats, said opposite end having a diametrical surface with a plurality of curvilinear axially extending vanes of relatively thin deformable cross section extending in the diametrical plane from the vicinity of said recess to the vicinity of the periphery of said diametrical surface, said vanes upon rotation of article about its axis being of a curvature adapted to move fluid material in a generally radial direction.

3. A molded deformable plastic nut comprising an elongated body having a closed end and a centrally located unthreaded cylindrical recess of predetermined diameter opening to the opposite end, said elongated body having a length substantially greater than the width and having outer side walls formed with wrench engageable flats, said opposite end being characterized as having a first relatively long axially extending lip of relatively thin cross section and of a diameter slightly greater than said predetermined diameter and concentric with said recess, said opposite end further having a workpiece engageable surface transverse to the axis of said recess and surrounding said extending lip, a second axially extending lip concentric with said first lip and located closer to said closed end than said first lip, said second lip being of relatively thin cross section and located at the radially outward margin of said workpiece engageable surface, said first lip extending outwardly from said workpiece engageable surface distance at least equal to one half of the diameter of said recess, the free end of said lip being tapered from a point intermediate the extremities of said lip to said free end whereby said lip is adapted to be laterally diverted when passing through a complementary aperture of a workpiece into engagement with a secondary workpiece and the side opposite said first workpiece to the side engaged by said workpiece engageable surface.

4. A molded plastic nut comprising an elongated body having a closed end and a centrally located unthreaded recess of predetermined diameter opening to the opposite end, said elongated body having a length substantially greater than the width and having outer side walls formed with wrench engageable flats, said opposite end being characterized as having a first relatively long axially extending lip of relatively thin cross section and of a diameter slightly greater than said predetermined diameter, said opposite end further having a workpiece engageable surface transverse to the axis of said recess and surrounding said extending lip, a second axially extending lip concentric with said first lip and located closer to said closed end than said first lip, said second lip being of relatively thin cross section and located at the radially outward margin of said workpiece engageable surface, said workpiece engageable surface having a plurality of curvilinear vanes of relatively thin cross section which project axially from said workpiece engageable surface.

References Cited by the Examiner

UNITED STATES PATENTS

| | | | |
|---|---|---|---|
| 2,018,301 | 10/1935 | Ferry | 85—35 |
| 2,300,478 | 11/1942 | Wiley | 52—718 |
| 2,303,706 | 12/1942 | Place | 52—718 |
| 2,795,144 | 6/1957 | Morse | 74—17.8 |
| 2,828,095 | 3/1958 | Beck et al. | 24—73 |
| 2,880,641 | 4/1959 | Sislik | 85—35 |

FOREIGN PATENTS

| | | |
|---|---|---|
| 797,380 | 7/1958 | Great Britain. |
| 806,962 | 1/1959 | Great Britain. |
| 560,705 | 10/1957 | Italy. |

RICHARD W. COOKE, JR., *Primary Examiner.*